(12) United States Patent
Jiao et al.

(10) Patent No.: US 10,871,584 B2
(45) Date of Patent: Dec. 22, 2020

(54) SEISMIC DATA PROCESSING

(71) Applicant: WESTERNGECO L.L.C., Houston, TX (US)

(72) Inventors: Kun Jiao, Katy, TX (US); Richard Timothy Coates, Houston, TX (US); Wei Huang, Katy, TX (US); Alan Schiemenz, Missouri City, TX (US); Denes Vigh, Houston, TX (US)

(73) Assignee: WESTERNGECO L.L.C., Houston, TX (US)

( * ) Notice: Subject to any disclaimer, the term of this patent is extended or adjusted under 35 U.S.C. 154(b) by 1582 days.

(21) Appl. No.: 14/292,487

(22) Filed: May 30, 2014

(65) Prior Publication Data
US 2014/0372044 A1    Dec. 18, 2014

Related U.S. Application Data

(60) Provisional application No. 61/836,025, filed on Jun. 17, 2013.

(51) Int. Cl.
*G01V 1/28*    (2006.01)

(52) U.S. Cl.
CPC ........ *G01V 1/282* (2013.01); *G01V 2210/169* (2013.01); *G01V 2210/57* (2013.01); *G01V 2210/614* (2013.01)

(58) Field of Classification Search
CPC ............. G01V 1/282; G01V 2210/169; G01V 2210/57; G01V 2210/614
USPC ......................................................... 702/16
See application file for complete search history.

(56) References Cited

U.S. PATENT DOCUMENTS

| 6,715,551 B2* | 4/2004 | Curtis | ..................... G01V 1/282 |
| | | | 166/150 |
| 7,003,439 B2* | 2/2006 | Aldred | ..................... E21B 44/00 |
| | | | 175/45 |
| 9,075,159 B2* | 7/2015 | Washbourne | ............ G01V 1/30 |

(Continued)

FOREIGN PATENT DOCUMENTS

WO    2012160331 A2    11/2012

OTHER PUBLICATIONS

Bunks, et al., "Multiscale seismic waveform inversion", Geophysics, vol. 60, Issue 5, Sep. 1995, pp. 1457-1473.

(Continued)

*Primary Examiner* — Stephanie E Bloss
(74) *Attorney, Agent, or Firm* — Michael Guthrie

(57) ABSTRACT

Disclosed herein are implementations of various technologies for a method for seismic data processing. The method may receive seismic data for a region of interest. The seismic data may be acquired in a seismic survey. The method may determine an exclusion criterion. The exclusion criterion may provide rules for selecting shot points in the acquired seismic data. The method may determine sparse seismic data using statistical sampling based on the exclusion criterion and the acquired seismic data. The method may determine simulated seismic data based on the earth model and shot points corresponding to the sparse seismic data. The method may determine an objective function that represents a mismatch between the sparse seismic data and the simulated seismic data. The method may update the earth model using the objective function.

17 Claims, 10 Drawing Sheets

(56) References Cited

U.S. PATENT DOCUMENTS

| | | | | |
|---|---|---|---|---|
| 2002/0053430 | A1* | 5/2002 | Curtis | G01V 1/282 |
| | | | | 166/250.01 |
| 2002/0103630 | A1* | 8/2002 | Aldred | E21B 44/00 |
| | | | | 703/10 |
| 2009/0006054 | A1 | 1/2009 | Song | |
| 2009/0070086 | A1 | 3/2009 | Le Ravalec et al. | |
| 2009/0157367 | A1* | 6/2009 | Meyer | E21B 7/04 |
| | | | | 703/10 |
| 2012/0143506 | A1 | 6/2012 | Routh et al. | |
| 2012/0314538 | A1* | 12/2012 | Washbourne | G01V 1/30 |
| | | | | 367/49 |
| 2016/0274256 | A1* | 9/2016 | Coates | G01V 1/282 |

OTHER PUBLICATIONS

Krebs, et al., "Fast full-wavefield seismic inversion using source encoding", Geophysics, vol. 28, 2009, pp. 2273-2277.

Lailly, "The seismic inverse problem as a sequence of before stack migrations", Conference on Inverse Scattering: Theory and Application SIAM: Society for Industrial and Applied Mathematics, Philadelphia, PA., 1983, pp. 206-220.

Plessix, et al., "Application of acoustic full waveform inversion to a low-frequency large-offset land data set", SEG Annual Meeting Technical Program Expanded Abstracts, 2010, pp. 930-934.

Pratt, "Frequency-domain elastic wave modeling by finite differences: A tool for crosshole seismic imaging", Geophysics, vol. 55, 1990, pp. 626-632.

Pratt, et al., "Seismic waveform inversion in the frequency domain, Part 2: Fault delineation in sediments using crosshole data", Geophysics, vol. 64, Jan. 1999, pp. 902-914.

Rudin, et al., "Nonlinear total variation based noise removal algorithms", Physica D, vol. 60 Issue 1-4, Nov. 1, 1992, pp. 259-268.

Tarantola, "Inversion of Seismic Reflection Data in the Acoustic Approximation", Geophysics, vol. 48, No. 8, Aug. 1984, pp. 1259-1266.

Van Leeuwen, et al., "Fast waveform inversion without source-encoding", Geophysical Prospecting, vol. 61, Issue Supplement S1, Jun. 2013, pp. 10-19.

Vigh, et al., "3D Prestack Plane-Wave, Full-Waveform Inversion", Geophysics, vol. 73, No. 5, 2008, pp. VE135-VE477.

Virieux, et al., "An overview of full-waveform inversion in exploration geophysics", Geophysics, vol. 74, No. 6, Dec. 3, 2009, WCC1-WCC26.

Tikhonov, et al., "Solutions of ill-posed problems", V.H. Winston & Sons, 1977, 258 pages.

Ha, et al., "Efficient Laplace-domain full waveform inversion using a cyclic shot subsampling method," Geophysics, Society of Exploration Geophysicists, US, vol. 78, No. 2, Mar. 1, 2013, pp. R37-R46.

Ben-Hadj-Ali et al., "An efficient frequency-domain full waveform inversion method using simultaneous encoded sources,", Geophysics, Society of Exploration Geophysicists, US, vol. 76, No. 4, Jul 1, 2011, pp. R109-R124.

Warner, et al., "Anisotropic 3D full-waveform inversion," Geophysics, Society of Exploration Geophysicists, US, vol. 78, No. 2, Mar. 1, 2013, pp. R59-R80.

European search report or supplementary European Search Report for the equivalent EP patent application 14814255.7 dated Jan. 2, 2017.

Communication pursuant to Article 94(3) EPC for the equivalent EP patent application 14814255.7 dated Feb. 3, 2017.

Examination Report issued in the CA application 2909973, dated Jun. 30, 2020 (6 pages).

International Search Report and Written Opinion issued in the PCT application PCT/US2014/042447, dated Oct. 10, 2014 (9 pages).

International Preliminary Report on Patentability issued in the PCT application PCT/US2014/042447, dated Dec. 22, 2019 (5 pages).

Office Action issued in the MX application MX/a/2015/016369, dated Oct. 3, 2019 (8 pages).

\* cited by examiner

SEISMIC DATA PROCESSING

CROSS-REFERENCE TO RELATED APPLICATION

This application claims the benefit of U.S. Provisional Patent Application Ser. No. 61/836,025 filed Jun. 17, 2013, which is incorporated herein by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., receivers or geophones located in seismic units) laid out in a seismic spread covering a region of the earth's surface. The recorded signals may then be processed to yield a seismic survey.

Accordingly, there is a need for methods and computing systems that can employ more effective and accurate methods for identifying, isolating, and/or processing various aspects of seismic signals or other data that is collected from a subsurface region or other multi-dimensional space.

SUMMARY

In some implementations, a method for seismic data processing is provided. The method may receive seismic data for a region of interest. The seismic data may be acquired in a seismic survey. The method may determine an exclusion criterion. The exclusion criterion may provide rules for selecting shot points in the acquired seismic data. The method may determine sparse seismic data using statistical sampling based on the exclusion criterion and the acquired seismic data. The method may determine simulated seismic data based on an earth model for the region of interest and shot points corresponding to the sparse seismic data. The method may determine an objective function that represents a mismatch between the sparse seismic data and the simulated seismic data. The method may update the earth model using the objective function.

In some implementations, the method may determine a gradient of the objective function. The method may also update the gradient of the objective function. The method may update the earth model using the updated gradient.

In some implementations, a method for seismic data processing is provided. The method may receive seismic data for a region of interest. The seismic data may be acquired in a seismic survey. The method may determine an exclusion radius that provides a predetermined minimum distance between sampled shot points in the acquired seismic data. The method may determine sparse seismic data using statistical sampling based on the exclusion radius and the acquired seismic data. The method may determine simulated seismic data based on an earth model for the region of interest and shot points corresponding to the sparse seismic data. The method may determine an objective function that represents a mismatch between the sparse seismic data and the simulated seismic data. The method may update the earth model using the objective function. The method may use the updated earth model to facilitate hydrocarbon exploration or production.

In some implementations, a method is provided. The method may receive survey data for a multi-dimensional region of interest. The survey data may be acquired in an imaging procedure. The method may determine an exclusion criterion. The exclusion criterion may provide rules for selecting survey points in the acquired survey data. The method may determine sparse survey data using statistical sampling based on the exclusion criterion and the acquired survey data. The method may determine sparse survey data using statistical sampling based on the exclusion criterion and the acquired seismic data. The method may determine simulated survey data based on a model for the multi-dimensional region of interest. The method may determine an objective function that represents a mismatch between the sparse survey data and the simulated survey data. The method may update the model for the multi-dimensional region of interest using the objective function.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

Figure 1:
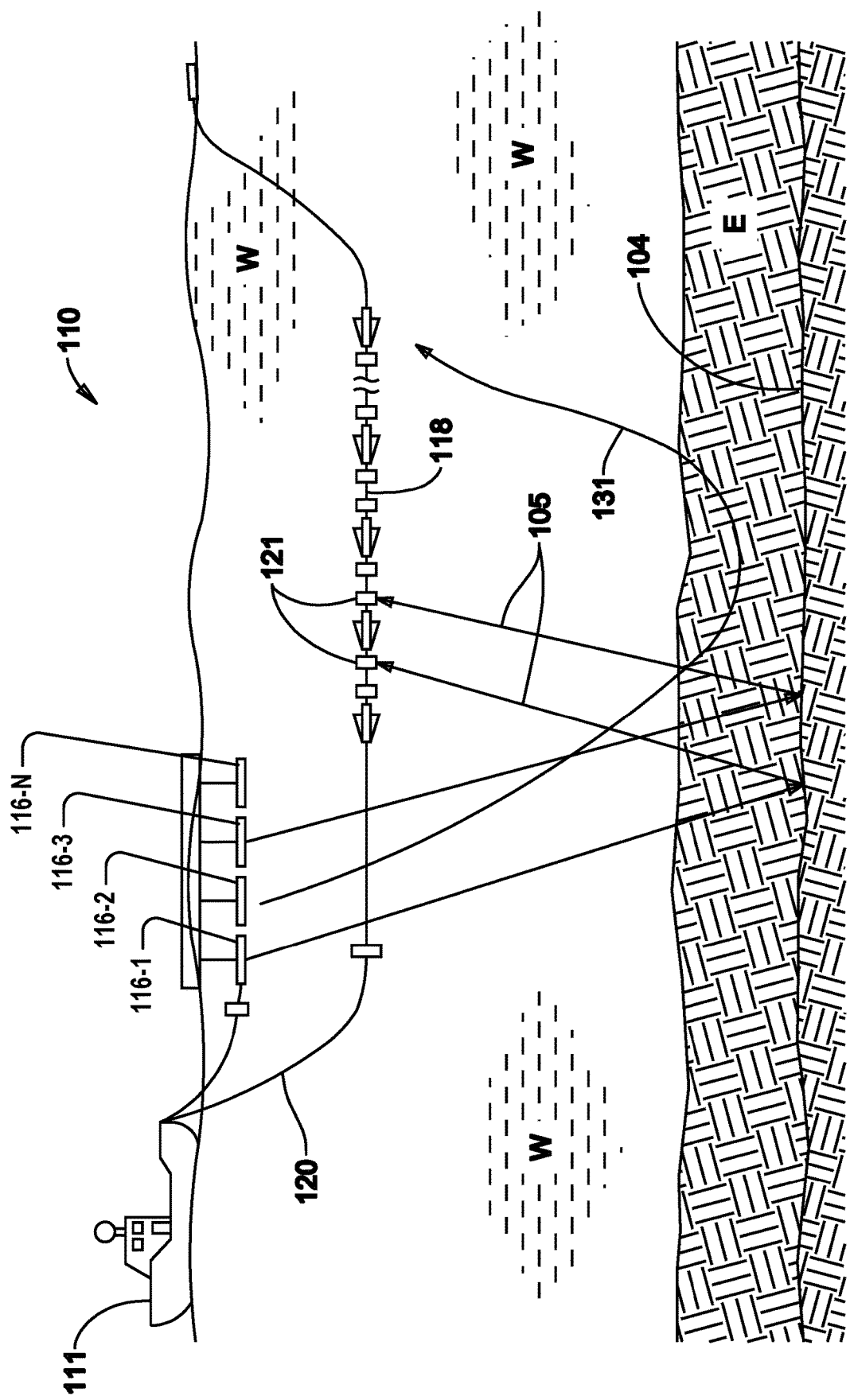
FIG. 1 illustrates a diagrammatic view of marine seismic surveying in accordance with various implementations described herein.

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc., may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Full-waveform inversion (FWD may describe a process of forward modeling a seismic response of the subsurface using an estimated elastic property earth model. In full-waveform inversion, a mismatch between observed seismic data and simulated seismic data (also called "synthetic seismic data") is measured, while an estimated earth model may be optimized through an iterative method until the mismatch satisfies predetermined stopping criteria. Various techniques described herein are directed to updating an earth model using statistical sampling of the observed seismic data to perform full-waveform inversion. Observed seismic data may be data acquired by a seismic survey as described in FIG. 1. FIG. 2 describes a method of performing full-waveform inversion.

Figure 2:
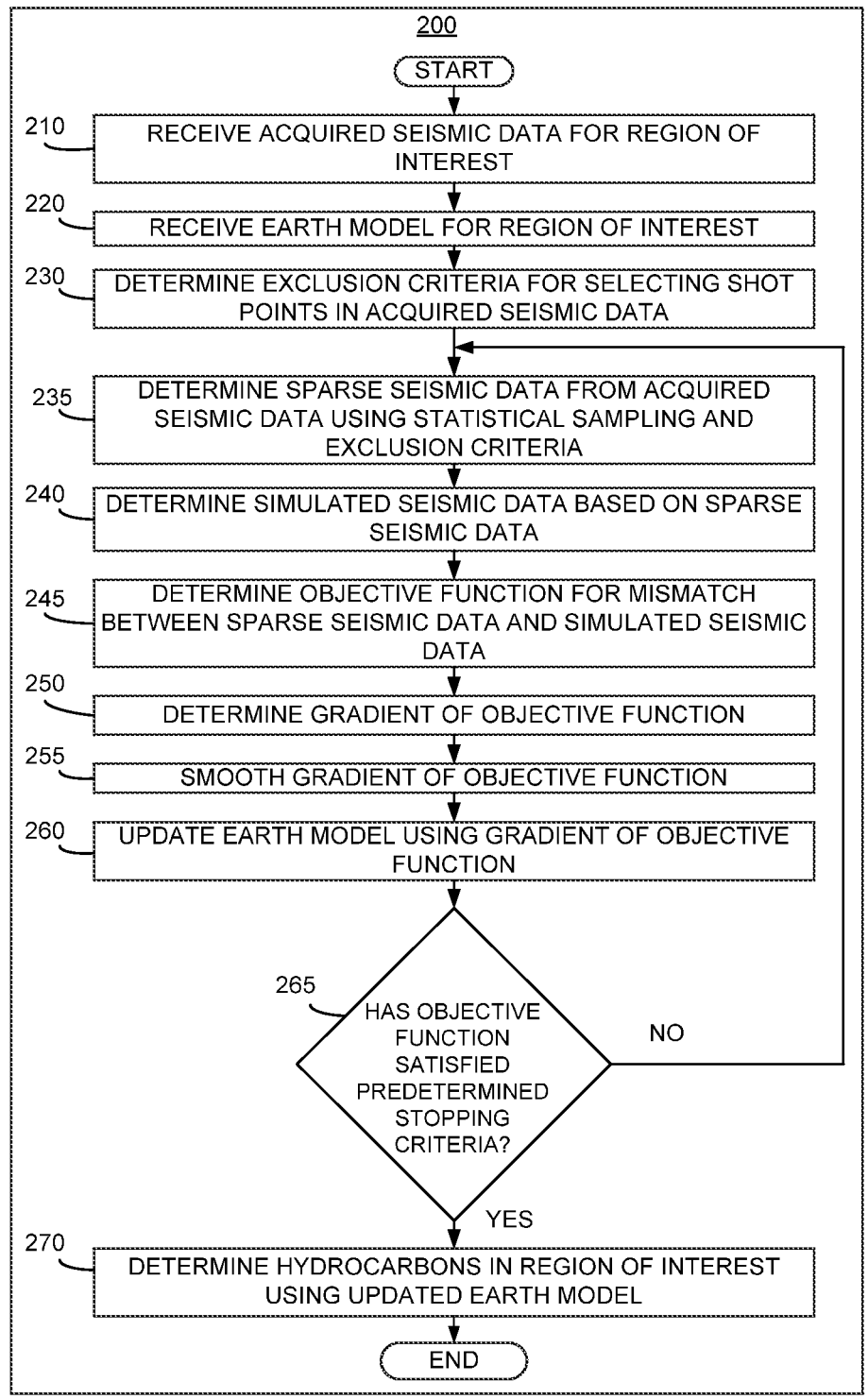
FIG. 2 illustrates a flow diagram of a method for processing seismic data in accordance with various implementations described herein.

FIG. 1 illustrates a diagrammatic view of marine seismic surveying 110 in connection with implementations of various techniques described herein. A marine seismic acquisition system 110 may include a vessel 111 carrying control components and towing a plurality of seismic sources 116-1, 116-2, 116-3 and 116-N and a plurality of streamers 118 equipped with seismic receivers 121. The seismic sources 116-1, 116-2, 116-3 and 116-N may include a single type of source, or different types. The sources may use any type of seismic generator, such as air guns, water guns, steam injection sources, controllable seismic sources, explosive sources such as dynamite or gas injection followed by detonation and the like. The streamers 118 may be towed by means of their respective lead-ins 120, which may be made from high strength steel or fiber-reinforced cables that convey electrical power, control, and data signals between the vessel 111 and the streamers 118. An individual streamer may include a plurality of seismic receivers 121 that may be distributed at spaced intervals along the streamer's length. The seismic receivers 121 may include hydrophone sensors as well as multi-component sensor devices, such as accelerometers. Further, the streamers 118 may include a plurality of inline streamer steering devices (SSDs), also known as "birds." The SSDs may be distributed at appropriate intervals along the streamers 118 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 116-1, 116-2, 116-3 and 116-N and the seismic streamers 118 may be deployed from the vessel 111 and towed slowly to traverse a region of interest. The seismic sources 116-1, 116-2, 116-3 and 116-N may be periodically activated to emit seismic energy in the form of an acoustic or pressure wave through the water. The seismic sources 116-1, 116-2, 116-3 and 116-N may be activated individually or substantially simultaneously with other sources. The acoustic wave may result in one or more seismic wavefields that travel coherently into the earth E underlying the water W. As the wavefields strike interfaces 104 between earth formations, or strata, they may be reflected and/or refracted back through the earth E and water W along paths 105 to the various receivers 121 where the wavefields (e.g., pressure waves in the case of air gun sources) may be converted to electrical signals, digitized and transmitted to the integrated computer-based seismic navigation, source controller, and recording system in the vessel 111 via the streamers 118 and lead-ins 120. For instance, a refracting or diving wave path 131 is shown passing through the earth E and water W from the seismic sources 116-1, 116-2, 116-3 and 116-N to the seismic receivers 121. Through analysis of these detected signals, it may be possible to determine the shape, position and lithology of the sub-sea formations, including those formations that may include hydrocarbon deposits. While a marine seismic survey is described in regard to FIG. 1, implementations of various techniques described herein may also be used in connection to a land seismic survey.

FIG. 2 illustrates a flow diagram of a method 200 for processing seismic data in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

At block 210, acquired seismic data are received for a region of interest (i.e., "the received seismic data" and also called "observed seismic data"). For instance, the acquired seismic data may correspond to one or more shot points (also called "shot records") from a seismic survey as described in FIG. 1. A shot point may describe seismic data that is obtained from firing one or more seismic sources at a particular shot location during a seismic survey. The region of interest may include an area of the subsurface in the earth that may be of particular interest, such as for hydrocarbon production.

At block 220, an earth model may be received for the region of interest (i.e., "the received earth model"). For instance, the received earth model may be a velocity model or an anisotropic model that describes the region of interest. As such, the received earth model may include elastic properties for specific regions in the subsurface of the earth. Elastic properties may include density, P-velocity (Vp) or velocity of the primary wave, S-velocity (Vs) or velocity of the shear wave, acoustic impedance, shear impedance, Poisson's ratio, or a combination thereof.

At block 230, one or more exclusion criteria may be determined for sampling the acquired seismic data. The exclusion criteria may include one or more rules that provide for selecting or excluding shot points and their corresponding seismic data from an acquired seismic dataset. For instance, the exclusion criteria may limit the number of shot points that may be randomly selected within a predetermined proximity of another shot point in a particular geographic area or survey area. In one implementation, the exclusion criteria may include an exclusion radius that provides a predetermined minimum distance between sampled shot points. The predetermined minimum distance may limit statistical sampling to shot points in the acquired seismic data that are outside a predetermined minimum distance from a previously selected shot point. If method 200 selects an invalid shot point (i.e., one that violates the exclusion criteria), method 200 may ignore that selection and randomly select another shot point from the acquired seismic data until a valid shot point is selected.

The exclusion radius may be determined based on one or more factors. For instance, the exclusion radius may be based on reducing the acquired seismic data down to a predetermined size. If a reduction in the acquired seismic data is desired (e.g., a sparse dataset that is 10% of the original size of the acquired seismic data), the exclusion radius may be determined such that the acquired seismic data is sampled to produce a predetermined number of shot points corresponding to the desired size of a sparse seismic dataset.

The exclusion radius may also be determined to achieve a predetermined sampling frequency of shot points in the inline and/or crossline directions of a seismic survey (i.e., to achieve a predetermined inline sampling or crossline sampling). This predetermined sampling frequency may be chosen to produce or prevent a non-aliased sparse seismic dataset. Aliasing may occur when the sampling frequency of a survey shot distribution is less than the Nyquist frequency of the pressure waves emitted by the seismic sources. For more information regarding an exclusion radius, see FIGS. 3A-3B below.

In another implementation, the exclusion criteria may include using a grid of seismic cells to select shot points in the acquired seismic data. For instance, the acquired seismic data from block 210 may be divided into a grid of seismic data cells. The exclusion criteria may limit statistical sampling of the acquired seismic data to a predetermined number of shot points within a respective seismic cell in the grid (e.g., selecting a single shot point from a respective seismic cell in the grid). For more information regarding exclusion criteria using a grid of seismic cells, see FIG. 3C below.

At block 235, sparse seismic data may be determined from the acquired seismic data at 210 using statistical sampling and the exclusion criteria. In statistical sampling, data points may be randomly selected to provide an estimate of a larger dataset. For instance, shot points corresponding to the acquired seismic data may be randomly selected to produce sparse seismic data. In one implementation, the acquired seismic data may be sampled using a sampling frequency to prevent aliasing in the sparse seismic data.

Furthermore, the determined exclusion criteria from block 230 may be used to limit which shot points for the acquired seismic data may be sampled. Without using exclusion criteria, the statistical sampling the acquired seismic data may result in a problematic dataset. In one situation, the sparse seismic data may have a disproportionate number of shot points selected from one survey region of the acquired seismic data, while selecting insufficient shot points in other regions of the acquired seismic data. In another situation, two or more shot points in the sparse seismic data may be closely-spaced together, which may provide little additional information to the method 200. Either situation may result in more iterations and added computational costs to satisfy one or more predetermined stopping criteria at block 265 below.

In one implementation, the exclusion criteria may include eliminating shot points that were already selected in a previous iteration of method 200 from the sampling process at block 235. Iterations may refer to repetitions of one or more of blocks 235-265 based on whether the objective function has satisfied one or more predetermined stopping criteria, such as convergence of the objective function. However, eliminating previously used shot points from the statistical sampling at block 235 may increase the number of unique shot points used in method 200, i.e., increasing the percentage of shot points from the original acquired seismic data that are used at least once in method 200.

In another implementation, selected shot points may be reused in different iterations. For instance, if a particular shot point is sampled to produce sparse seismic data in one iteration, the same shot point may be replaced or made available for use in the next or a later iteration. This may allow shot points and their corresponding seismic data to be used in multiple iterations in method 200. As such, the number of available shot points for sampling may remain constant.

In another implementation, the number of shot points sampled at block 235 may remain constant during subsequent iterations of method 200. This may result in a fixed size of the sparse seismic data for each iteration. Furthermore, the exclusion criteria, e.g., the exclusion radius, may remain the same between iterations in order to sample the same number of shot points as the previous iterations.

In another implementation, the number of shot points sampled at block 235 may be increased by a predetermined amount in subsequent iterations of method 200. As such, early iterations may have less computational costs than later iterations that sample more shot points of the acquired seismic data. As the number of selected shot points increase during method 200, the exclusion criteria may be updated accordingly. For instance, if the exclusion criteria include an exclusion radius, the predetermined minimum distance may be decreased in later iterations to provide for randomly selecting more shot points. If the exclusion criteria include a grid of seismic cells, the size of a respective seismic cell may be decreased to increase the number of selected shot points.

Figure 3A:
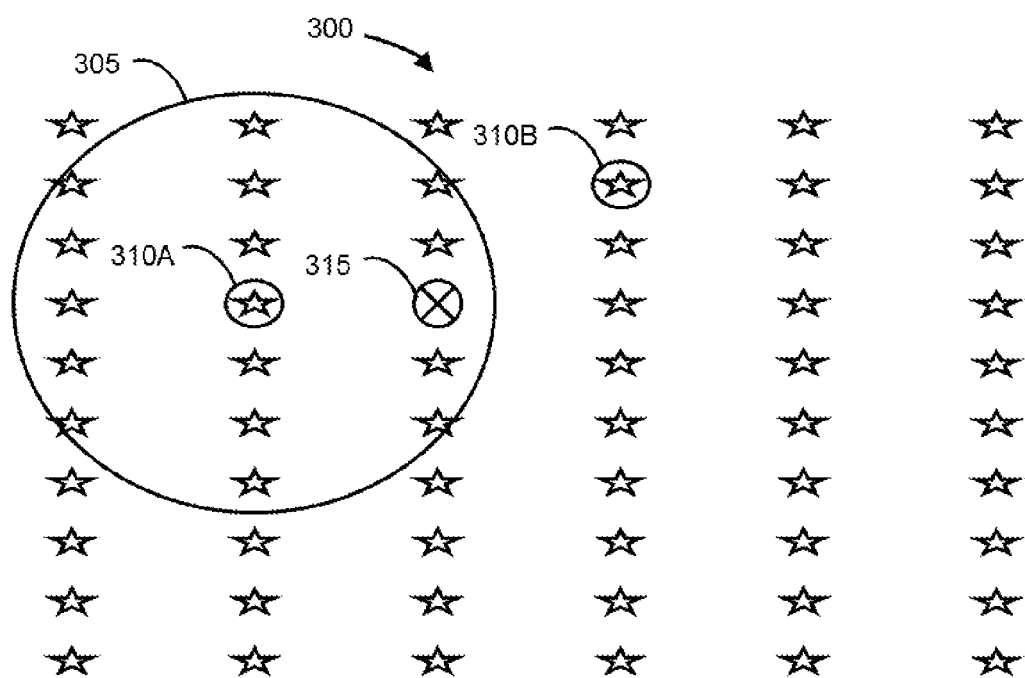
FIG. 3A illustrates an example of statistically sampling shot points from a survey shot distribution in accordance with various implementations described herein.
Figure 3B:
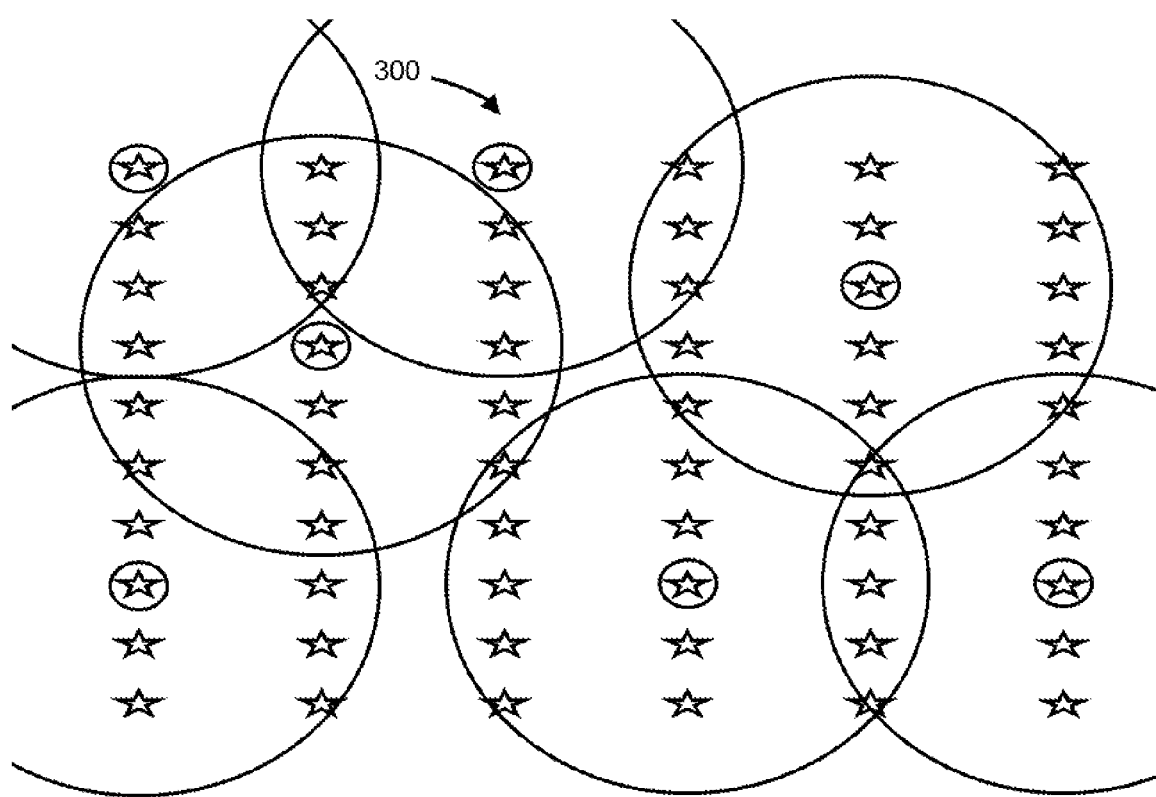
FIG. 3B illustrates an example of statistically sampling shot points from a survey shot distribution in accordance with various implementations described herein.
Figure 3C:
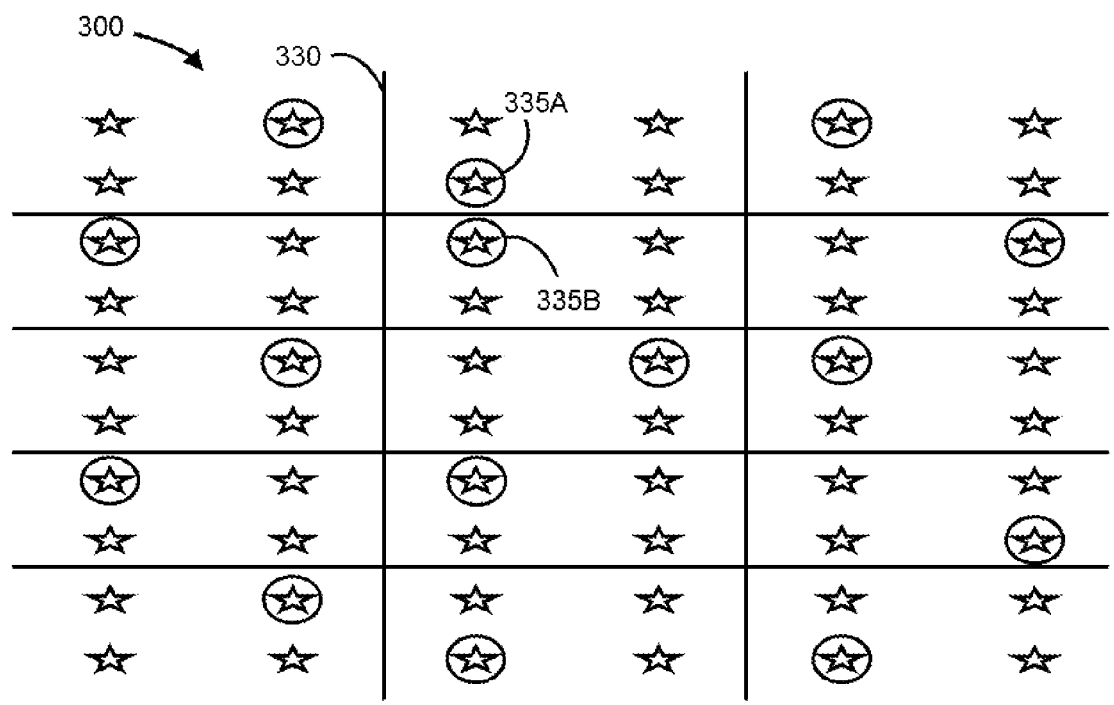
FIG. 3C illustrates an example of statistically sampling shot points from a survey shot distribution in accordance with various implementations described herein.

FIGS. 3A-3C illustrate various examples of statistically sampling shot points from a survey shot distribution 300 in accordance with various implementations described herein. As shown in FIG. 3A, a shot point 310A is randomly selected from the survey shot distribution 300. An exclusion radius 305 is determined that corresponds to the randomly selected shot point 310A. The exclusion radius 305 may provide the extent of the area in the survey shot distribution 300 where future shot points may not be selected from. As such, the next valid shot point may be shot point 310B that is selected outside the exclusion radius 305. Shot point 315, by being inside the exclusion radius 305, may be an invalid shot point and excluded from being in the sparse seismic data.

FIG. 3B illustrates a subset of shot points that are randomly selected from the survey shot distribution 300 without any two shot points being within the exclusion radius of another shot point. The randomly selected shot points in FIG. 3B may provide an example of the sparse seismic data determined at block 235.

FIG. 3C illustrates a survey shot distribution over a survey area in accordance with various implementations described herein. As shown, the survey shot distribution 300 is divided into a grid 330 of respective seismic cells. While the respective seismic cells are shown to include four shot points, other implementations are envisioned with more or fewer shot points positioned in the respective seismic cells. Keeping with FIG. 3C, some instances may occur where two shot points (e.g., shot points 335A and 335B) are randomly selected next to one another. However, the grid 330 may prevent an over-representation of data from a particular area in survey shot distribution 300 by providing a balanced selection of shot points.

Returning to FIG. 2, at block 240, simulated seismic data may be determined based on the sparse seismic data and the received earth model. For instance, the simulated seismic data may be determined by performing a computer simulation of a seismic survey using the received earth model. Using one or more selected shot points, a seismic wave may be forward modeled from the selected shot points through the subsurface to the receivers in a seismic acquisition system. The shot points that are used in the simulated seismic survey may be the same shot points that were selected sparse seismic data at block 235.

At block 245, an objective function is determined. The objective function may represent the mismatch between acquired seismic data and simulated seismic data based on the received earth model. As such, the objective function may refer to the relationship between the acquired seismic data and the simulated seismic data, as described in Equation 1 below, and/or the measured mismatch between the acquired seismic data and the simulated seismic data. Furthermore, the objective function may provide a solution to a seismic inverse problem, such as one used for full-waveform inversion. In full-waveform inversion, a forward modeling operator F(m) may map the received earth model over an inversion domain $\Omega$ to a data domain, thereby producing forward modeled data. To obtain a solution for the inverse problem, full-waveform inversion may include an optimization process to minimize the mismatch f (m) between the forward modeled data and observed seismic data, as described by the objective function. For instance, the objective function may be expressed by the following equation:

$$\min f(m) = \frac{1}{2} \Sigma_S \Sigma_R \|F(m) - d_{acq}\|^2 \qquad \text{Equation 1}$$

where m includes parameters (e.g., elastic properties) of the received earth model, S refers to selected shot points from a seismic survey, R refers to selected receivers from a seismic survey, F(m) is the forward modeling operator based on the earth model that maps the seismic response of the subsurface, and $d_{acq}$ is the observed seismic data. F(m) may be the simulated seismic data from block 240 and $d_{acq}$ may be the sparse seismic data from block 235. S may include the shot points selected using statistical sampling at block 235. However, many different solutions may exist for the objective function at Equation 1.

In one implementation, the objective function may be a regularized objective function. Regularization may be used to stabilize the solution of an objective function for a seismic inverse problem by reducing the size of the possible null space for the seismic inverse problem, which may reduce the amount of possible solutions. Regularization may include introducing a priori information into an objective function. A priori information may include inferences about an inverse problem that may be made based on the particular physics of the problem, such as the natural bedding process of the subsurface. In one implementation, a regularized objection function may be expressed by the following equation:

$$\min f(m) = \frac{1}{2} \Sigma_S \Sigma_R \|F(m) - d_{acq}\|^2 + Reg(m) \qquad \text{Equation 2}$$

where m includes properties from an earth model, F(m) is the forward-modeled seismic response based on the earth model, $d_{acq}$ is the observed seismic data, S refers to selected shot points from a seismic survey, R refers to selected receivers from a seismic survey, and Reg(m) is regularization function based on the earth model and a priori information. Reg(m) may be specified using the following equation:

$$Reg(m) = \frac{1}{2} \int_\Omega h[\|\nabla m\|^2] \qquad \text{Equation 3}$$

where $\Omega$ is the seismic inversion domain, m includes parameters of the received earth model, $\nabla m$ is the spatial gradient vector of the model parameter m, and h describes a compactly supported infinitely differentiable function.

At block 250, the gradient of the objective function may be determined. For instance, in full-waveform inversion, the gradient of the objective function g(m) may be expressed by the following equation:

$$g(m) = \nabla f(m) \qquad \text{Equation 4}$$

The gradient g(m) may be computed by any applicable method, such as the adjoint-state formulation. For instance, in an adjoint-state formulation, state variables (e.g., the seismic wavefield variables) may be computed by forward modeling the seismic response of the subsurface. Then, an adjoint source may be computed for the state variables and the objective function. Next, the adjoint state variables (e.g., the seismic wavefields from the adjoint source) may be computed by backward modeling the seismic wavefields. Finally, the gradient of the objective function may be computed using the state variables and the adjoint state variables.

At block 255, the gradient of the objective function may be smoothed (i.e., "the updated gradient of the objective function" or "the pre-conditioned gradient"). For instance, the gradient of the objective function based on the sparse seismic data and the simulated seismic data may include missing or inaccurate values from using a sparse portion of the acquired seismic data from block 210. As such, smoothing the gradient may remove "source foot-print" effects. An unsmoothed gradient may also be prone to converging to local minima at block 265 below. The gradient may be smoothed at block 255 using Tikhonov regularization, a total variation regulation, or any other type of smoothing process. Smoothing parameters for block 255 may be based on the spacing of selected shot points in the sparse seismic data or the source frequency bandwidth as used in the seismic survey to obtain the acquired seismic data.

At block 260, the received earth model may be updated using the gradient of the objective function from blocks 250 or 255. The received earth model may be updated iteratively, such as according to the rule $m_{k+1}=m_k+\alpha_k p_k$, where $m_k$ is the received earth model at iteration k, $\alpha_k$ is the step size or length determined by a line search procedure with the search direction $p_k$, and $m_{k+1}$ is the updated earth model. The search direction $p_k$ may be selected using the updated gradient of the objective function and the selected optimization technique that is being used, such as one of steepest descent, conjugate gradient, or Newton/quasi-Newton directions. The step length corresponds to the amount of change for model parameters in the updated earth model.

At block 265, it may be determined whether the objective function has satisfied one or more predetermined stopping criteria. For instance, the objective function may be analyzed for whether it has converged to a value or stopped decreasing from one iteration to the next iteration. The predetermined stopping criteria may be a specified threshold where convergence occurs, such as when the difference between the sparse seismic data from block 235 and the simulated seismic data from block 240 is below the specified threshold. The specified threshold may be submitted by a user. The specified threshold may be based on the noise level of the received seismic data. In another instance, the specified threshold may be a point determined by a user where method 200 introduces geologically implausible features into the gradient from block 250, such as due to method 200 attempting to fit the seismic data to noise. Specified thresholds may also include quality control (QC) criteria, such as the flatness of the image gather.

If the objective function satisfies the predetermined stopping criteria, the process may proceed to block 270. If the objective function fails to satisfy the predetermined stopping criteria, the process may return to block 235 to repeat one or more of blocks 235-260 using the updated earth model from block 260 in place of the received earth model from block 220.

At block 270, the updated earth model may be used to determine the presence of hydrocarbons in the region of interest. For instance, the updated earth model may be used to facilitate hydrocarbon exploration or production. In one implementation, a petrophysical model may be estimated based on a final earth model from block 265. The petrophysical model may include various petrophysical properties that describe the region of interest such as the amount of shale (Vshale), the elastic moduli of composite rock or the density of the solid phase of rock. For more information regarding hydrocarbon exploration or production, see the section titled OIL OPERATION below.

In some implementations, a method for seismic data processing is provided. The method may receive seismic data for a region of interest. The seismic data may be acquired in a seismic survey. The method may determine an exclusion criterion. The exclusion criterion may provide rules for selecting shot points in the acquired seismic data. The method may determine sparse seismic data using statistical sampling based on the exclusion criterion and the acquired seismic data. The method may determine simulated seismic data based on an earth model for the region of interest and shot points corresponding to the sparse acquired seismic data. The method may determine an objective function that represents a mismatch between the sparse seismic data and the simulated seismic data. The method may update the earth model using the objective function.

In some implementations, the method may determine a gradient of the objective function. The method may also update the gradient of the objective function. The method may update the earth model using the updated gradient. The method may also iteratively update the earth model and the gradient of the objective function until the objective function satisfies predetermined stopping criteria or converges. Updating the gradient of the objective function may include smoothing the gradient of the objective function.

In some implementation, the exclusion criterion may include an exclusion radius. The exclusion radius may provide a predetermined minimum distance between shot points in the sparse seismic data. The exclusion radius may be based on reducing the acquired seismic data down to a predetermined size. The exclusion radius may be based on selecting a predetermined sampling frequency of shot points to produce a non-aliased seismic dataset. The method may divide the acquired seismic data into a grid of seismic data cells for the exclusion criterion. The sparse seismic data may be determined by selecting a single shot point in a respective seismic data cell in the grid. The method may select shot points in a manner that would prevent aliasing in the sparse seismic data. The simulated seismic data may be determined by performing a computer simulation of a seismic survey using shot points corresponding to the sparse seismic data with the earth model. The method may use the updated earth model to facilitate hydrocarbon exploration or production. The earth model may include elastic properties such as density, P-velocity (Vp), S-velocity (Vs), acoustic impedance, shear impedance, Poisson's ratio, elastic stiffness, elastic compliances or a combination thereof. The method may use a search direction and a step size found by a line search method to update elastic property values in the earth model.

In some implementations, an information processing apparatus for use in a computing system is provided, and includes means for receiving seismic data for a region of interest. The seismic data may be acquired in a seismic survey. The information processing apparatus may also have means for determining an exclusion criterion. The exclusion criterion may provide rules for selecting shot points in the acquired seismic data. The information processing apparatus may also have means for determining sparse seismic data using statistical sampling based on the exclusion criterion and the acquired seismic data. The information processing apparatus may also have means for determining simulated seismic data based on an earth model for the region of interest and shot points corresponding to the acquired seismic data. The information processing apparatus may also have means for determining an objective function that represents a mismatch between the sparse seismic data and the simulated seismic data. The information processing apparatus may also have means for updating the earth model using the objective function.

In some implementations, a computing system is provided that includes at least one processor, at least one memory, and one or more programs stored in the at least one memory, wherein the programs include instructions, which when executed by the at least one processor cause the computing system to receive seismic data for a region of interest. The seismic data may be acquired in a seismic survey. The programs may further include instructions to cause the computing system to determine an exclusion criterion. The exclusion criterion may provide rules for selecting shot points in the acquired seismic data. The programs may further include instructions to cause the computing system to determine sparse seismic data using statistical sampling based on the exclusion criterion and the acquired seismic data. The programs may further include instructions to cause the computing system to determine simulated seismic data based on an earth model for the region of interest and shot points corresponding to the sparse seismic data. The programs may further include instructions to cause the computing system to determine an objective function that represents a mismatch between the sparse seismic data and the simulated seismic data. The programs may further include instructions to cause the computing system to update the earth model using the objective function.

In some implementations, a computer readable storage medium is provided, which has stored therein one or more programs, the one or more programs including instructions, which when executed by a processor, cause the processor to receive seismic data for a region of interest. The seismic data may be acquired in a seismic survey. The programs may further include instructions, which cause the processor to determine an exclusion criterion. The exclusion criterion may provide rules for selecting shot points in the acquired seismic data. The programs may further include instructions, which cause the processor to determine sparse seismic data using statistical sampling based on the exclusion criterion and the acquired seismic data. The programs may further include instructions, which cause the processor to determine simulated seismic data based on an earth model for the region of interest and shot points corresponding to the sparse seismic data. The programs may further include instructions, which cause the processor to determine an objective function that represents a mismatch between the sparse seismic data and the simulated seismic data. The programs may further include instructions, which cause the processor to update the earth model using the objective function.

In some implementations, a method for seismic data processing is provided. The method may receive seismic data for a region of interest. The seismic data may be acquired in a seismic survey. The method may determine an exclusion radius. The exclusion radius may provide a predetermined minimum distance between sampled shot points in the acquired seismic data. The method may determine sparse seismic data using statistical sampling based on the exclusion radius and the acquired seismic data. The method may determine simulated seismic data based on an earth model for the region of interest and shot points corresponding to the sparse acquired seismic data. The method may determine an objective function that represents a mismatch between the sparse seismic data and the simulated seismic data. The method may update the earth model using the objective function. The method may use the updated earth model to facilitate hydrocarbon exploration or production.

In some implementations, the method may determine a gradient of the objective function. The method may also update the gradient of the objective function. The method may update the earth model using the updated gradient. The method may also iteratively update the earth model and the gradient of the objective function until the objective function satisfies predetermined stopping criteria or converges. Updating the gradient of the objective function may include smoothing the gradient of the objective function.

In some implementation, the exclusion radius may be based on reducing the acquired seismic data down to a predetermined size. The exclusion radius may be based on selecting a predetermined sampling frequency of shot points to produce a non-aliased seismic dataset. The method may select shot points in a manner that would prevent aliasing in the sparse seismic data. The simulated seismic data may be determined by performing a computer simulation of a seismic survey using shot points corresponding to the sparse seismic data with the earth model. The method may use the updated earth model to facilitate hydrocarbon exploration or production. The earth model may include elastic properties such as density, P-velocity (Vp), S-velocity (Vs), acoustic impedance, shear impedance, Poisson's ratio, elastic stiffness, elastic compliances or a combination thereof. The method may use a search direction and a step size found by a line search method to update elastic property values in the earth model.

In some implementations, an information processing apparatus for use in a computing system is provided, and includes means for receiving seismic data for a region of interest. The seismic data may be acquired in a seismic survey. The information processing apparatus may also have means for determining an exclusion radius. The exclusion radius may provide a predetermined minimum distance between sampled shot points in the acquired seismic data. The information processing apparatus may also have means for determining sparse seismic data using statistical sampling based on the exclusion radius and the acquired seismic data. The information processing apparatus may also have means for determining simulated seismic data based on an earth model for the region of interest and shot points corresponding to the acquired seismic data. The information processing apparatus may also have means for determining an objective function that represents a mismatch between the sparse seismic data and the simulated seismic data. The information processing apparatus may also have means for updating the earth model using the objective function.

In some implementations, a computing system is provided that includes at least one processor, at least one memory, and one or more programs stored in the at least one memory, wherein the programs include instructions, which when executed by the at least one processor cause the computing system to receive seismic data for a region of interest. The seismic data may be acquired in a seismic survey. The programs may further include instructions to cause the computing system to determine an exclusion radius. The exclusion radius may provide a predetermined minimum distance between sampled shot points in the acquired seismic data. The programs may further include instructions to cause the computing system to determine sparse seismic data using statistical sampling based on the exclusion radius and the acquired seismic data. The programs may further include instructions to cause the computing system to determine simulated seismic data based on an earth model for the region of interest and shot points corresponding to the sparse seismic data. The programs may further include instructions to cause the computing system to determine an objective function that represents a mismatch between the sparse seismic data and the simulated seismic data. The programs may further include instructions to cause the computing system to update the earth model using the objective function.

In some implementations, a computer readable storage medium is provided, which has stored therein one or more programs, the one or more programs including instructions, which when executed by a processor, cause the processor to receive seismic data for a region of interest. The seismic data may be acquired in a seismic survey. The programs may further include instructions, which cause the processor to determine an exclusion radius. The exclusion radius may provide a predetermined minimum distance between sampled shot points in the acquired seismic data. The programs may further include instructions, which cause the processor to determine sparse seismic data using statistical sampling based on the exclusion radius and the acquired seismic data. The programs may further include instructions, which cause the processor to determine simulated seismic data based on an earth model for the region of interest and shot points corresponding to the sparse seismic data. The programs may further include instructions, which cause the processor to determine an objective function that represents a mismatch between the sparse seismic data and the simulated seismic data. The programs may further include instructions, which cause the processor to update the earth model using the objective function.

In some implementations, a method for processing data corresponding to a multi-dimensional region of interest is provided. The method may receive survey data for the multi-dimensional region of interest. The survey data may be acquired in an imaging procedure. The method may determine an exclusion criterion. The exclusion criterion may provide rules for selecting survey points in the acquired survey data. The method may determine sparse survey data using statistical sampling based on the exclusion criterion and the acquired survey data. The method may determine simulated survey data based on a model for the multi-dimensional region of interest and survey points corresponding to the sparse survey data. The method may determine an objective function that represents a mismatch between the sparse survey data and the simulated survey data. The method may update the model for the multi-dimensional region of interest using the objective function.

In some implementations, an information processing apparatus for use in a computing system is provided, and includes means for receiving survey data for a multi-dimensional region of interest. The survey data may be acquired in an imaging procedure. The information processing apparatus may also have means for determining an exclusion criterion. The exclusion criterion may provide rules for selecting survey points in the acquired survey data. The information processing apparatus may also have means for determining sparse survey data using statistical sampling based on the exclusion criterion and the acquired survey data. The information processing apparatus may also have means for determining simulated survey data based on a model for the multi-dimensional region of interest and survey points corresponding to the sparse survey data. The information processing apparatus may also have means for determining an objective function that represents a mismatch between the sparse survey data and the simulated survey data. The information processing apparatus may also have means for updating the model for the multi-dimensional region of interest using the objective function.

In some implementations, a computing system is provided that includes at least one processor, at least one memory, and one or more programs stored in the at least one memory, wherein the programs include instructions, which when executed by the at least one processor cause the computing system to receive survey data for a multi-dimensional region of interest. The survey data may be acquired in an imaging procedure. The programs may further include instructions to cause the computing system to determine an exclusion criterion. The exclusion criterion may provide rules for selecting shot points in the acquired survey data. The programs may further include instructions to cause the computing system to determine sparse survey data using statistical sampling based on the exclusion criterion and the acquired seismic data. The programs may further include instructions to cause the computing system to determine simulated survey data based on a model for the multi-dimensional region of interest and survey points corresponding to the sparse survey data. The programs may further include instructions to cause the computing system to determine an objective function that represents a mismatch between the sparse survey data and the simulated survey data. The programs may further include instructions to cause the computing system to update the model for the multi-dimensional region of interest using the objective function.

In some implementations, a computer readable storage medium is provided, which has stored therein one or more programs, the one or more programs including instructions, which when executed by a processor, cause the processor to receive survey data for a multi-dimensional region of interest. The survey data may be acquired in an imaging procedure. The programs may further include instructions, which cause the processor to determine an exclusion criterion. The exclusion criterion may provide rules for selecting survey points in the acquired survey data. The programs may further include instructions, which cause the processor to determine simulated survey data based on a model for the multi-dimensional region of interest and survey points corresponding to the sparse survey data. The programs may further include instructions, which cause the processor to determine an objective function that represents a mismatch between the sparse survey data and the simulated survey data. The programs may further include instructions, which cause the processor to update the model for the multi-dimensional region of interest using the objective function.

In some implementations, the multi-dimensional region of interest is selected from the group consisting of a subterranean region, human tissue, plant tissue, animal tissue, solid volumes, substantially solid volumes, volumes of liquid, volumes of gas, volumes of plasma, and volumes of space near and/or outside the atmosphere of a planet, asteroid, comet, moon, or other body.

In some implementations, the multi-dimensional region of interest includes one or more volume types selected from the group consisting of a subterranean region, human tissue, plant tissue, animal tissue, solid volumes, substantially solid volumes, volumes of liquid, volumes of air, volumes of plasma, and volumes of space near and/or or outside the atmosphere of a planet, asteroid, comet, moon, or other body.

Oil Operation

Figure 4A:
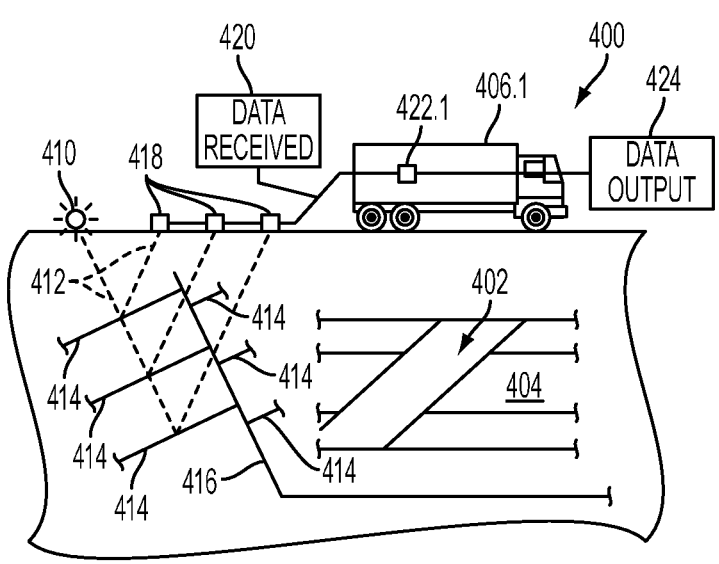
FIGS. 4A-4D illustrate schematic views of oilfields in accordance with various implementations described herein.

FIGS. 4A-4D illustrate simplified, schematic views of oilfield 400 having subterranean formation 402 containing reservoir 404 therein in accordance with implementations of various technologies and techniques described herein. FIG. 4A illustrates a survey operation being performed by a survey tool, such as seismic truck 406.1, to measure properties of the subterranean formation. The survey operation is a seismic survey operation for producing sound vibrations. In FIG. 4A, one such sound vibration, e.g., sound vibration 412 generated by source 410, reflects off horizons 414 in earth formation 416. A set of sound vibrations is received by sensors, such as geophone-receivers 418, situated on the earth's surface. The data received 420 is provided as input data to a computer 422.1 of a seismic truck 406.1, and responsive to the input data, computer 422.1 generates seismic data output 424. This seismic data output may be stored, transmitted or further processed as desired, for example, by data reduction.

Figure 4B:
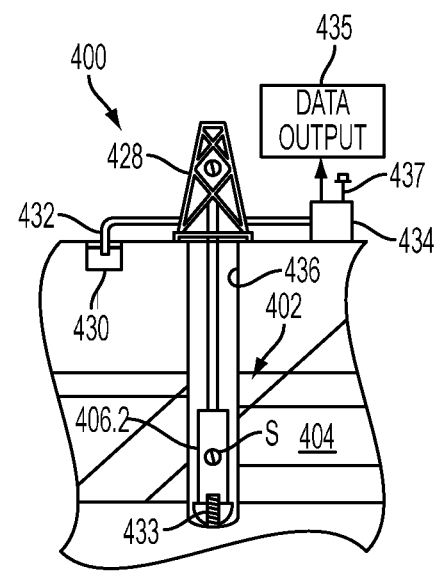

FIG. 4B illustrates a drilling operation being performed by drilling tools 406.2 suspended by rig 428 and advanced into subterranean formations 402 to form wellbore 436. Mud pit 430 is used to draw drilling mud into the drilling tools via flow line 432 for circulating drilling mud down through the drilling tools, then up wellbore 436 and back to the surface. The drilling mud is filtered and returned to the mud pit. A circulating system may be used for storing, controlling, or filtering the flowing drilling mud. The drilling tools are advanced into subterranean formations 402 to reach reservoir 404. Each well may target one or more reservoirs. The drilling tools are adapted for measuring downhole properties using logging while drilling tools. The logging while drilling tools may also be adapted for taking core sample 433 as shown.

Computer facilities may be positioned at various locations about the oilfield 400 (e.g., the surface unit 434) and/or at remote locations. Surface unit 434 may be used to communicate with the drilling tools and/or offsite operations, as well as with other surface or downhole sensors. Surface unit 434 is capable of communicating with the drilling tools to send commands to the drilling tools, and to receive data therefrom. Surface unit 434 may also collect data generated during the drilling operation and produce data output 435, which may then be stored or transmitted.

Sensors (S), such as gauges, may be positioned about oilfield 400 to collect data relating to various oilfield operations as described previously. As shown, sensor (S) is positioned in one or more locations in the drilling tools and/or at rig 428 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 406.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 434. The bottom hole assembly further includes drill collars for performing various other measurement functions.

The bottom hole assembly may include a communication subassembly that communicates with surface unit 434. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electro-magnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 434 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 434 may include transceiver 437 to allow communications between surface unit 434 and various portions of the oilfield 400 or other locations. Surface unit 434 may also be provided with or functionally connected to one or more controllers (not shown) for actuating mechanisms at oilfield 400. Surface unit 434 may then send command signals to oilfield 400 in response to data received. Surface unit 434 may receive commands via transceiver 437 or may itself execute commands to the controller. A processor may be provided to analyze the data (locally or remotely), make the decisions and/or actuate the controller. In this manner, oilfield 400 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

Figure 4C:
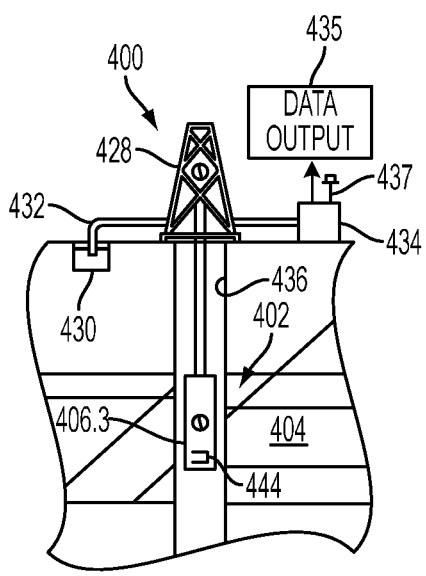

FIG. 4C illustrates a wireline operation being performed by wireline tool 406.3 suspended by rig 428 and into wellbore 436 of FIG. 4B. Wireline tool 406.3 is adapted for deployment into wellbore 436 for generating well logs, performing downhole tests and/or collecting samples. Wireline tool 406.3 may be used to provide another method and apparatus for performing a seismic survey operation. Wireline tool 406.3 may, for example, have an explosive, radioactive, electrical, or acoustic energy source 444 that sends and/or receives electrical signals to surrounding subterranean formations 402 and fluids therein.

Wireline tool 406.3 may be operatively connected to, for example, geophones 418 and a computer 422.1 of a seismic truck 406.1 of FIG. 4A. Wireline tool 406.3 may also provide data to surface unit 434. Surface unit 434 may collect data generated during the wireline operation and may produce data output 435 that may be stored or transmitted.

Wireline tool 406.3 may be positioned at various depths in the wellbore 436 to provide a survey or other information relating to the subterranean formation 402.

Sensors (S), such as gauges, may be positioned about oilfield 400 to collect data relating to various field operations as described previously. As shown, sensor S is positioned in wireline tool 406.3 to measure downhole parameters which relate to, for example porosity, permeability, fluid composition and/or other parameters of the field operation.

Figure 4D:
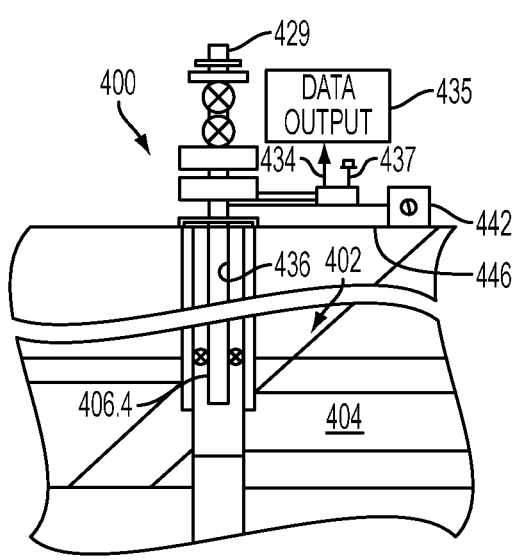

FIG. 4D illustrates a production operation being performed by production tool 406.4 deployed from a production unit or Christmas tree 429 and into completed wellbore 436 for drawing fluid from the downhole reservoirs into surface facilities 442. The fluid flows from reservoir 404 through perforations in the casing (not shown) and into production tool 406.4 in wellbore 436 and to surface facilities 442 via gathering network 446.

Sensors (S), such as gauges, may be positioned about oilfield 400 to collect data relating to various field operations as described previously. As shown, the sensor (S) may be positioned in production tool 406.4 or associated equipment, such as Christmas tree 429, gathering network 446, surface facility 442, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 4B-4D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 4A-4D are intended to provide a brief description of an example of a field usable with oilfield application frameworks. Part of, or the complete, oilfield 400 may be on land, water, and/or sea. Also, while a single field measured at a single location is depicted, oilfield applications may be utilized with any combination of one or more oilfields, one or more processing facilities and one or more wellsites.

Figure 5:
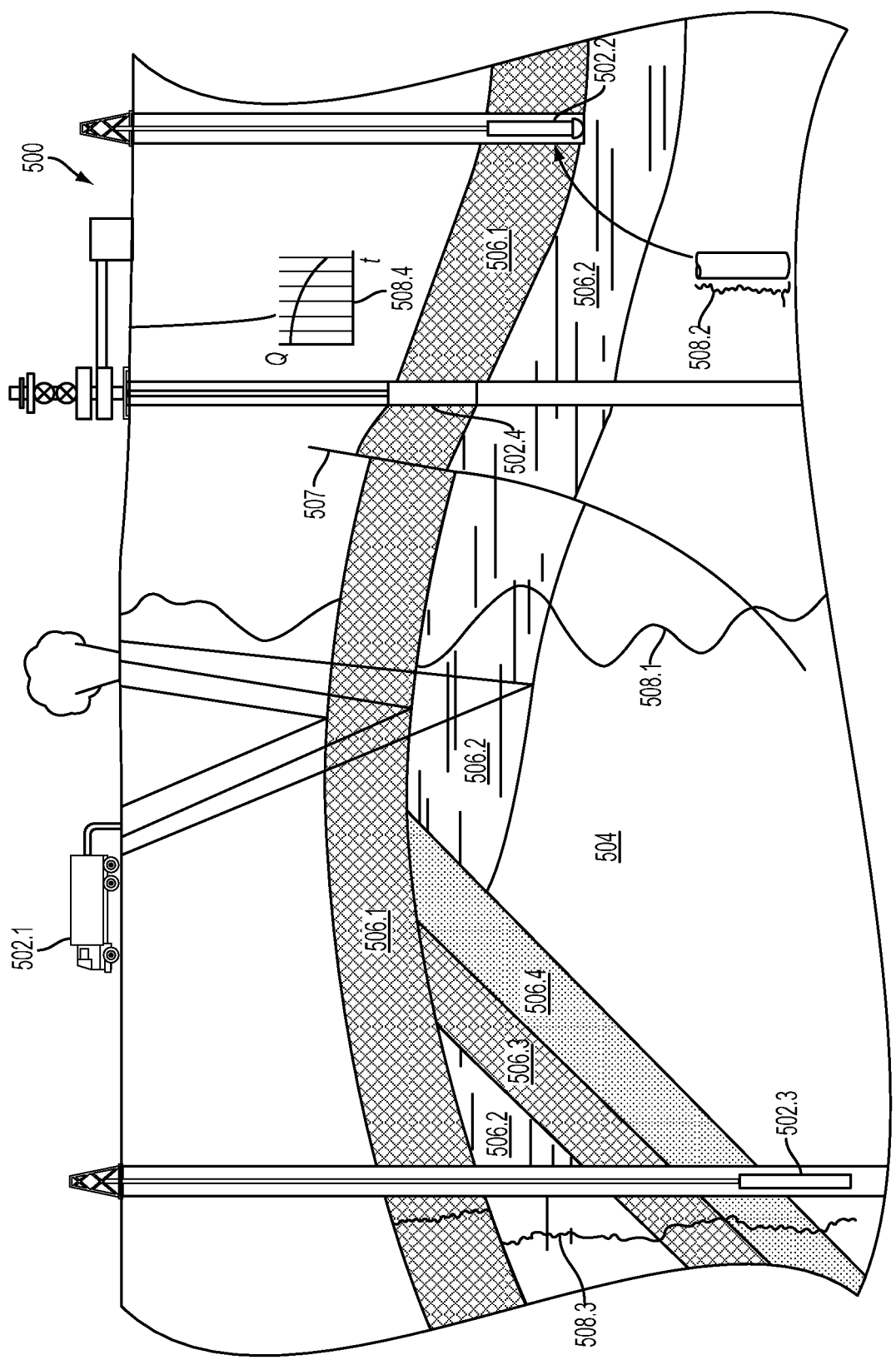
FIG. 5 illustrates a schematic view of an oilfield in accordance with various implementations described herein.

FIG. 5 illustrates a schematic view, partially in cross section of oilfield 500 having data acquisition tools 502.1, 502.2, 502.3 and 502.4 positioned at various locations along oilfield 500 for collecting data of subterranean formation 504 in accordance with implementations of various technologies and techniques described herein. Data acquisition tools 502.1-502.4 may be the same as data acquisition tools 406.1-406.4 of FIGS. 4A-4D, respectively, or others not depicted. As shown, data acquisition tools 502.1-502.4 generate data plots or measurements 508.1-508.4, respectively. These data plots are depicted along oilfield 500 to demonstrate the data generated by the various operations.

Data plots 508.1-508.3 are examples of static data plots that may be generated by data acquisition tools 502.1-502.3, respectively; however, it should be understood that data plots 508.1-508.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 508.1 is a seismic two-way response over a period of time. Static plot 508.2 is core sample data measured from a core sample of the formation 504. The core sample may be used to provide data, such as a graph of the density, porosity, permeability, or some other physical property of the core sample over the length of the core. Tests for density and viscosity may be performed on the fluids in the core at varying pressures and temperatures. Static data plot 508.3 is a logging trace that provides a resistivity or other measurement of the formation at various depths.

A production decline curve or graph 508.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 504 has a plurality of geological formations 506.1-506.4. As shown, this structure has several formations or layers, including a shale layer 506.1, a carbonate layer 506.2, a shale layer 506.3 and a sand layer 506.4. A fault 507 extends through the shale layer 506.1 and the carbonate layer 506.2. The static data acquisition tools are adapted to take measurements and detect characteristics of the formations.

While a specific subterranean formation with specific geological structures is depicted, it will be appreciated that oilfield 500 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 500, it will be appreciated that one or more types of measurement may be taken at one or more locations across one or more fields or other locations for comparison and/or analysis.

The data collected from various sources, such as the data acquisition tools of FIG. 5, may then be processed and/or evaluated. Typically, seismic data displayed in static data plot 508.1 from data acquisition tool 502.1 is used by a geophysicist to determine characteristics of the subterranean formations and features. The core data shown in static plot 508.2 and/or log data from well log 508.3 are typically used by a geologist to determine various characteristics of the subterranean formation. The production data from graph 508.4 is typically used by the reservoir engineer to determine fluid flow reservoir characteristics. The data analyzed by the geologist, geophysicist and the reservoir engineer may be analyzed using modeling techniques.

Figure 6:
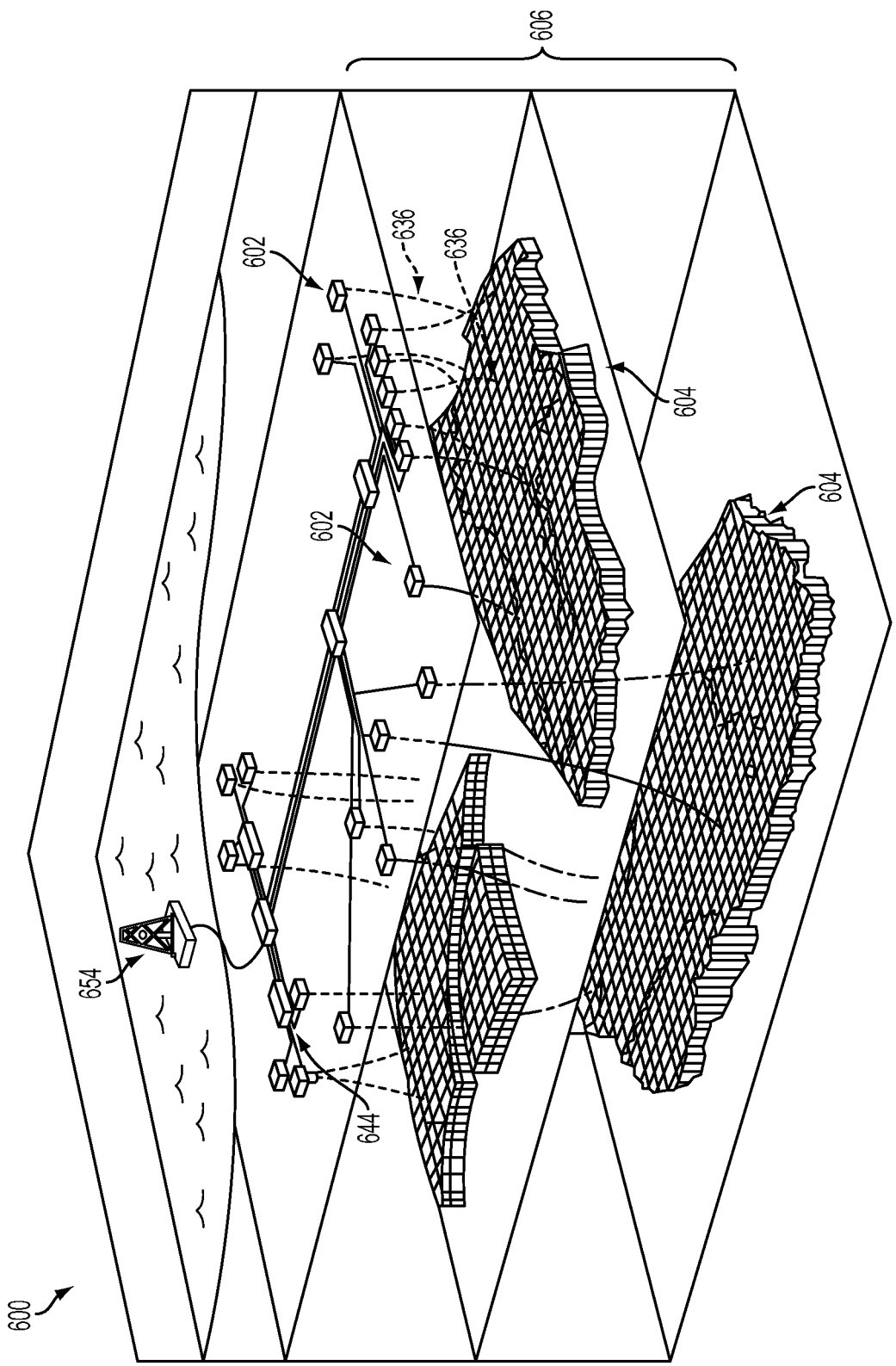
FIG. 6 illustrates an oilfield in accordance with various implementations described herein.

FIG. 6 illustrates an oilfield 600 for performing production operations in accordance with implementations of various technologies and techniques described herein. As shown, the oilfield has a plurality of wellsites 602 operatively connected to central processing facility 654. The oilfield configuration of FIG. 6 is not intended to limit the scope of the oilfield application system. Part, or the entirety, of the oilfield may be on land and/or sea. Also, while a single oilfield with a single processing facility and a plurality of wellsites is depicted, any combination of one or more oilfields, one or more processing facilities and one or more wellsites may be present.

Each wellsite 602 has equipment that forms wellbore 636 into the earth. The wellbores extend through subterranean formations 606 including reservoirs 604. These reservoirs 604 contain fluids, such as hydrocarbons. The wellsites draw fluid from the reservoirs and pass them to the processing facilities via surface networks 644. The surface networks 644 have tubing and control mechanisms for controlling the flow of fluids from the wellsite to processing facility 654.

Figure 7:
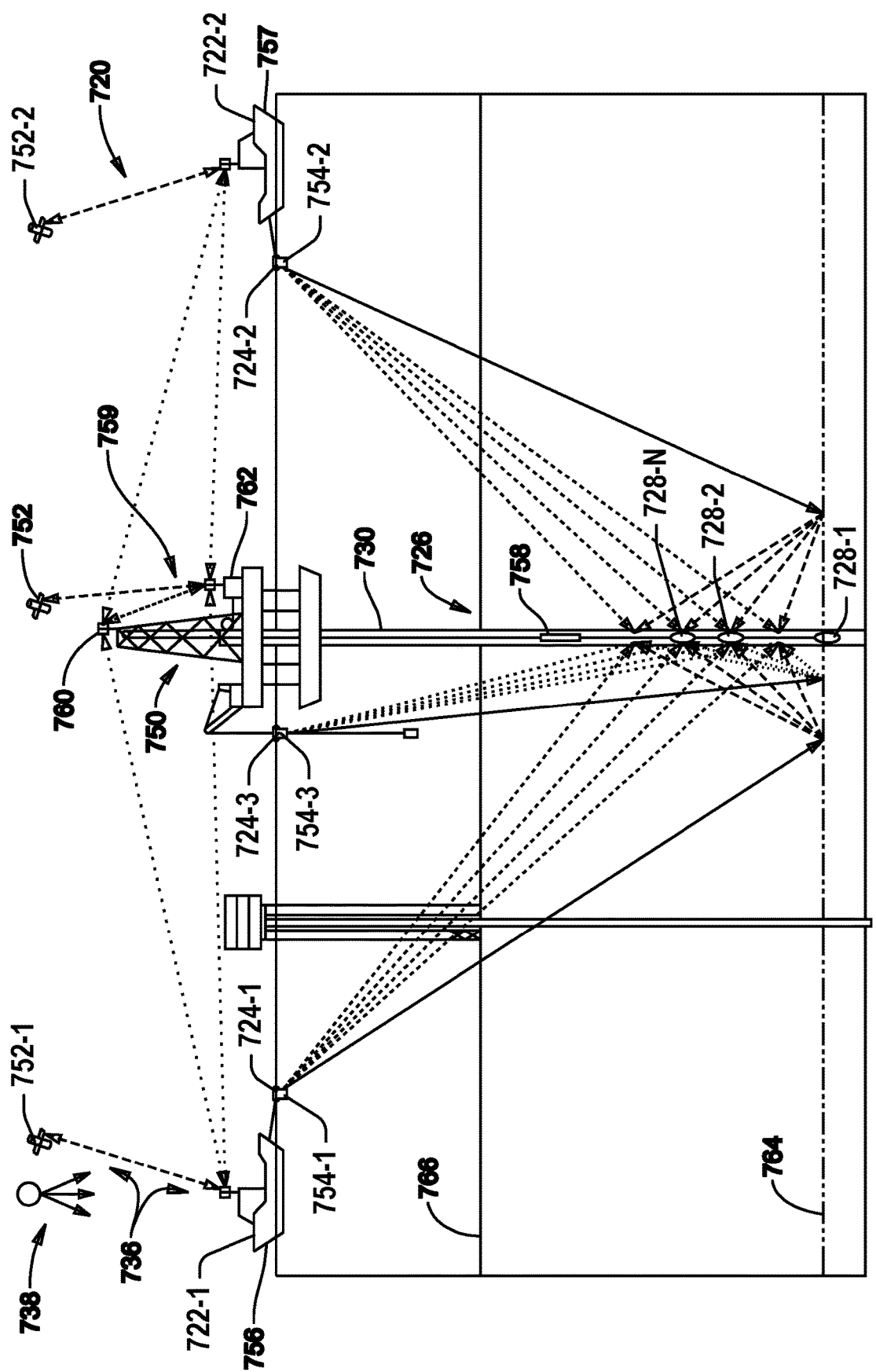
FIG. 7 illustrates a seismic system in accordance with various implementations described herein.

Attention is now directed to FIG. 7 that depicts an embodiment of seismic system 720 in which a plurality of tow vessels 722-1 and 722-2 is employed to enable seismic profiling, e.g., three-dimensional vertical seismic profiling or rig/offset vertical seismic profiling. In FIG. 7, a marine system is illustrated as including a rig 750, the plurality of tow vessels 722-1 and 722-2, and one or more acoustic receivers 728-1, 728-2 and 728-N. The tow vessel 722-1 is shown as including at least one source 724-1, which may be a source array, and the tow vessel 722-2 is shown as including at least one source 724-2, which may be a source array. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two tow vessels 722-1 and 722-2 are illustrated in FIG. 7, one of the tow vessels 722-1 or 722-2 or the multiple tow vessels 722-1 and 722-2 may be used. In some applications, at least one source 724-3, which may be a source array, may be located on the rig 750. As the tow vessels 722-1 and 722-2 travel on predetermined or systematic paths, their locations may be recorded through the use of navigation system 736. In some cases, the navigation system 736 utilizes a global positioning system (GPS) 738 to record the position, speed, direction, and other parameters of the tow vessels 722-1 and 722-2.

As illustrated, the global positioning system 738 may utilize or work in cooperation with satellites 752-1 and 752-2 which operate on a suitable communication protocol, e.g., VSAT communications. The VSAT communications may be used, among other things, to supplement VHF and UHF communications. The GPS information can be independent of the VSAT communications and may be input to a processing system or other suitable processors to predict the future movement and position of the tow vessels 722-1 and 722-2 based on real-time information. In addition to predicting future movements, the processing system also can be utilized to provide directions and coordinates as well as to determine initial shot times, as described above. A control system effectively utilizes the processing system in cooperation with a source controller and a synchronization unit to synchronize the sources 724-1 and 724-2 (and/or 724-3) with the downhole data acquisition system 726.

As illustrated, the one or more tow vessels 722-1 and 722-2 each tow a corresponding at least one source 724-1 and 724-2. The at least one source 724-1 and the at least one source 724-2 can each include one or more seismic signal generators 754-1, 754-2 and 754-3, e.g., air guns, configured to create a seismic/sonic disturbance. In the embodiment illustrated, the tow vessels 722-1 and 722-2 comprise a master source vessel 756 (Vessel A) and a slave source vessel 757 (Vessel B). However, other numbers and arrangements of the tow vessels 722-1 and 722-2 may be employed to accommodate the parameters of a given seismic profiling application. For example, the at least one source 724-3 may be mounted at rig 750 (see FIG. 7) or at another suitable location, and both of the tow vessels 722-1 and 722-2 may serve as slave vessels with respect to the at least one source 724-3 or with respect to a source at another location.

However, a variety of source arrangements and implementations may be provided as desired for a given application. When utilizing dithered timing between the sources, for example, the master and slave locations of the sources can be adjusted according to the parameters of the specific seismic profiling application. In some applications, one of the tow vessels 722-1 and 722-2 (e.g., the source vessel 756 in FIG. 7) may serve as the master source vessel while the other one of the tow vessels 722-1 and 722-2 serves as the slave source vessel with dithered firing. However, the tow vessel 722-2 (e.g., the source vessel 757 in FIG. 7) may serve as the master source vessel while the other tow vessel 722-1 serves as the slave source vessel with dithered firing.

Similarly, the at least one source 724-3 may serve as the master source while one of the tow vessels 722-1 and 722-2 (e.g., the vessel 756) serves as the slave source vessel with dithered firing. The at least one source 724-3 also may serve as the master source while the tow vessel 722-2 (e.g., the vessel 757) serves as the slave source vessel with dithered firing. In some applications, the at least one source 724-3 may serve as the master source while both of the tow vessels 722-1 and 722-2 serve as slave source vessels each with dithered firings. These and other arrangements may be used in achieving the desired synchronization of the sources 724-1, 724-2 and/or 724-3 with the downhole acquisition system 726.

The acoustic receivers 728-1, 728-2 and 728-N of data acquisition system 726 may be deployed in borehole 730 via a variety of delivery systems, such as wireline delivery systems, slickline delivery systems, and other suitable delivery systems. Although a single one of the acoustic receivers 728-1, 728-2 and 728-N could be used in the borehole 730, the illustrated embodiment comprises a plurality of acoustic receivers 728-1, 728-2 and 728-N that may be located in a variety of positions and orientations. The acoustic receivers 728-1, 728-2 and 728-N may be configured for sonic and/or seismic reception. Additionally, the acoustic receivers 728-1, 728-2 and 728-N may be communicatively coupled with processing equipment 758 located downhole. By way of example, processing equipment 758 may comprise a telemetry system for transmitting data from the acoustic receivers 728-1, 728-2 and 728-3 to additional processing equipment 759 located at the surface, e.g., on the rig 750 and/or the tow vessels 722-1 and 722-2.

Depending on the specifics of a given data communication system, examples of surface processing equipment 759 may comprise a radio repeater 760, an acquisition and logging unit 762, and a variety of other and/or additional signal transfer components and signal processing components. The radio repeater 760 along with other components of processing equipment 759 may be used to communicate signals, e.g., UHF and/or VHF signals, between the tow vessels 722-1 and 722-2 and the rig 750 and to enable further communication with the downhole data acquisition system 726.

It should be noted the UHF and VHF signals can be used to supplement each other. In general, the UHF band supports a higher data rate throughput but can be susceptible to obstructions and has less range. The VHF band is less susceptible to obstructions and has increased radio range but its data rate throughput is lower. In FIG. 7, for example, the VHF communications are illustrated as "punching through" an obstruction in the form of a production platform.

In some applications, the acoustic receivers 728-1, 728-2 and 728-N are coupled to the surface processing equipment 759 via a hardwired connection. In other embodiments, wireless or optical connections may be employed. In still other embodiments, combinations of coupling techniques may be employed to relay information received downhole via the acoustic receivers 728-1, 728-2 and 728-N to an operator and/or control system, e.g., control system, located at least in part at the surface.

In addition to providing raw or processed data uphole to the surface, the coupling system, e.g., the downhole processing equipment 758 and the surface processing equipment 759, may be designed to transmit data or instructions downhole to the acoustic receivers 728-1, 728-2 and 728-N. For example, the surface processing equipment 759 may comprise synchronization unit which coordinates the firing of the sources 724-1, 724-2 and 724-3, e.g., dithered (delayed) source arrays, with the acoustic receivers 728-1, 728-2 and 728-N located in the borehole 730. According to one embodiment, the synchronization unit uses coordinated universal time to ensure accurate timing. In some cases, the coordinated universal time system is employed in cooperation with the global positioning system 738 to obtain UTC data from the GPS receivers of the GPS system 738.

FIG. 7 illustrates one example of a system for performing seismic profiling that can employ simultaneous or near-simultaneous acquisition of seismic data. By way of example, the seismic profiling may comprise three-dimensional vertical seismic profiling but other applications may utilize rig/offset vertical seismic profiling or seismic profiling employing walkaway lines. An offset source can be provided by the at least one source 724-3 located on the rig 750, on one of the tow vessels 722-1 and 722-2 being stationary, and/or on another stationary vessel or structure.

As an example, the overall seismic system 720 may employ various arrangements of the sources 724-1, 724-2 and 724-3 on the tow vessels 722-1 and 722-2 and/or the rig 750 with each location having at least one source/source array 72'1 to generate acoustic source signals. The acoustic receivers 728-1, 728-2 and 728-N of the downhole acquisition system 726 are configured to receive the source signals, at least some of which are reflected off a reflection boundary 764 located beneath a sea bottom 766. The acoustic receivers 728-1, 728-2 and 728-N generate data streams that are relayed uphole to a suitable processing system, e.g., via the downhole telemetry/processing equipment 758.

While the acoustic receivers 728-1, 728-2 and 728-N generate data streams, the navigation system 736 determines a real-time speed, position, and direction of each of the tow vessels 722-1 and 722-2 and also estimates initial shot times accomplished via the signal generators 754-1, 754-2, and 754-3 of the appropriate at least one source 724-1 and 724-2. The source controller may be part of the surface processing equipment 759 (located on the rig 750, on the tow vessels 722-1 and 722-2, or at other suitable locations) and is designed to control firing of the acoustic source signals so that the timing of an additional shot time (e.g., a shot time via the slave vessel 757) is based on the initial shot time (e.g., a shot time via the master vessel 756) plus a dither value.

The synchronization unit of, for example, the surface processing equipment 759, coordinates the firing of dithered acoustic signals with recording of acoustic signals by the downhole acquisition system 726. Processor system is configured to separate a data stream of the initial shot and a data stream of the additional shot via the coherency filter. As discussed above, however, other embodiments may employ pure simultaneous acquisition and/or may not perform separation of the data streams. In such cases, the dither is effectively zero.

After an initial shot time at T=0 (T0) is determined, subsequent firings of acoustic sources 724-1, 724-2 may be offset by a dither. The dithers can be positive or negative and sometimes are created as pre-defined random delays. Use of dithers facilitates the separation of simultaneous or near-simultaneous data sets to simplify the data processing. The ability to have the acoustic sources 724-1 and 724-2 fire in simultaneous or near-simultaneous patterns reduces the overall amount of time used for three-dimensional vertical seismic profiling source acquisition. This, in turn, reduces rig time. As a result, the overall cost of the seismic operation is reduced, rendering the data intensive process much more accessible.

If the acoustic source arrays used in the seismic data acquisition are widely separated, the difference in move-outs across the acoustic receiver array of the wave fields generated by the acoustic sources 724-1 and 724-2 can be sufficient to obtain a clean data image via processing the data without further special considerations. However, even when the acoustic sources 724-1 and 724-2 are substantially co-located in time, data acquired by any of the methods involving dithering of the firing times of the individual sources of the acoustic sources 724-1 and 724-2 described herein can be processed to a formation image leaving hardly any artifacts in the final image. This is accomplished by taking advantage of the incoherence of the data generated by one of the acoustic sources 724-1 and 724-2 when seen in the reference time of the other one of the acoustic sources 724-1 and 724-2.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc., that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 8:
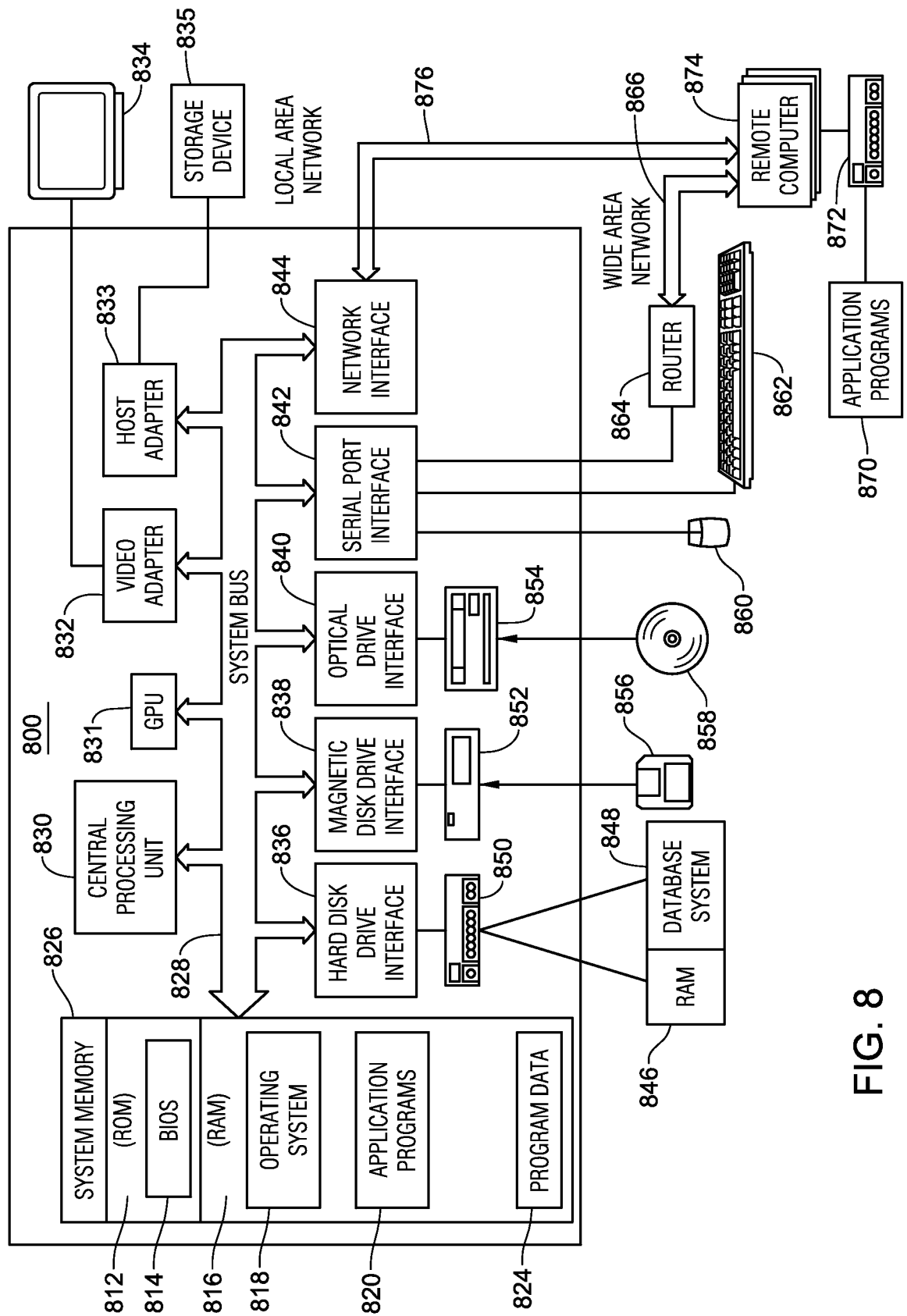
FIG. 8 illustrates a computer system in which the various technologies and techniques described herein may be incorporated and practiced.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 816. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 836, a magnetic disk drive interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, external RAM 846, and a database system 848. The application programs 820 may include various mobile applications ("apps") and other applications configured to perform various methods and techniques described herein. The operating system 818 may be any suitable operating system that may control the operation of a networked personal or server computer, such as WINDOWS® XP, MAC OS® X, Unix-variants (e.g., LINUX® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 834 or other type of display device may also be connected to system bus 828 via an interface, such as a video adapter 832. In addition to the monitor 834, the computing system 800 may further include other peripheral output devices such as speakers and printers.

Further, the computing system 800 may operate in a networked environment using logical connections to one or more remote computers 874. The logical connections may be any connection that is commonplace in offices, enterprise-wide computer networks, intranets, and the Internet, such as local area network (LAN) 876 and a wide area network (WAN) 866. The one or more remote computers 874 (see remote computer 872) may be another a computer, a server computer, a router, a network PC, a peer device or other common network node, and may include many of the elements describes above relative to the computing system 800. The one or more remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 842. In a networked environment, program modules depicted relative to the computing system 800, or portions thereof, may be stored in a remote memory storage device 835. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method for seismic data processing, comprising:
   receiving an earth model that comprises elastic properties;
   receiving seismic data for a region of interest, wherein the seismic data were acquired in a seismic survey;
   determining at least one exclusion criterion that provides one or more rules for selecting shot points in the acquired seismic data;
   determining sparse seismic data using statistical sampling based at least in part on the at least one exclusion criterion and the acquired seismic data;
   determining simulated seismic data based at least in part on the earth model for the region of interest and shot points corresponding to the sparse seismic data;
   determining an objective function that represents a mismatch between the sparse seismic data and the simulated seismic data;
   determining a gradient of the objective function;
   determining a smoothed gradient of the objective function based at least in part on at least one of the at least one exclusion criterion;
   performing a search based at least in part on the smoothed gradient wherein performing a search comprises using a search direction and a step size found by a line search method;
   updating values of the elastic properties of the earth model based at least in part on the search to generate an updated earth model wherein the step size corresponds to an amount of change for elastic properties as model parameters in the updated earth model; and
   based at least in part on the updated earth model, determining a presence of hydrocarbons in the region of interest.

2. The method of claim 1, comprising iteratively updating the values of the elastic properties.

3. The method of claim 1, wherein the at least one exclusion criterion comprises an exclusion radius that provides a predetermined minimum distance between shot points in the sparse seismic data.

4. The method of claim 3, wherein the exclusion radius is based on reducing the acquired seismic data down to a predetermined size.

5. The method of claim 3, wherein the exclusion radius is based on selecting a predetermined sampling frequency of shot points to produce a non-aliased seismic dataset.

6. The method of claim 1, wherein determining the at least one exclusion criterion comprises dividing the acquired seismic data into a grid of seismic data cells.

7. The method of claim 6, wherein determining the sparse seismic data comprises selecting a single shot point in a respective seismic data cell in the grid.

8. The method of claim 1, wherein determining the sparse seismic data comprises selecting shot points in a manner that would prevent aliasing in the sparse seismic data.

9. The method of claim 1, wherein the simulated seismic data are determined by performing a computer simulation of a seismic survey using the shot points corresponding to the sparse seismic data with the earth model.

10. The method of claim 1, further comprising using the updated earth model to facilitate hydrocarbon exploration or production.

11. The method of claim 1, wherein the earth model comprises one or more of the following elastic properties:
   density;
   P-velocity (Vp);
   S-velocity (Vs);
   acoustic impedance;
   shear impedance;
   Poisson's ratio;
   elastic stiffness;
   elastic compliances; or
   a combination thereof.

12. A non-transitory computer-readable medium having stored thereon computer-executable instructions which, when executed by a computer, cause the computer to:
   receive an earth model that comprises elastic properties;
   receive seismic data for a region of interest, wherein the seismic data were acquired in a seismic survey;
   determine at least one exclusion criterion that provides one or more rules for selecting shot points in the acquired seismic data;
   determine sparse seismic data using statistical sampling based at least in part on the at least one exclusion criterion and the acquired seismic data;
   determine simulated seismic data based at least in part on the earth model for the region of interest and shot points corresponding to the sparse seismic data;
   determine an objective function that represents a mismatch between the sparse seismic data and the simulated seismic data;
   determine a gradient of the objective function;
   determine a smoothed gradient of the objective function based at least in part on at least one of the at least one exclusion criterion;
   perform a search based at least in part on the smoothed gradient wherein the search comprises a search direction and a step size found by a line search method;
   update values of the elastic properties of the earth model based at least in part on the search to generate an updated earth model wherein the step size corresponds to an amount of change for elastic properties as model parameters in the updated earth model; and
   based at least in part on the updated earth model, determine a presence of hydrocarbons in the region of interest.

13. The non-transitory computer-readable medium of claim 12, wherein the computer-executable instructions comprise computer-executable instructions which, when executed by the computer, cause the computer to:
   iteratively update the values of elastic properties.

14. The non-transitory computer-readable medium of claim 12, wherein the at least one exclusion criterion comprises an exclusion radius that is determined based on reducing the acquired seismic data down to a predetermined size.

15. The non-transitory computer-readable medium of claim 12, wherein the at least one exclusion criterion comprises an exclusion radius that is determined based on selecting a predetermined sampling frequency of shot points to produce a non-aliased seismic dataset.

16. The non-transitory computer-readable medium of claim 12, wherein the computer-executable instructions which, when executed by the computer, cause the computer to determine the sparse seismic data using statistical sampling comprises computer-executable instructions which, when executed by the computer, cause the computer to select shot points in a manner that would prevent aliasing in the sparse seismic data.

17. A system comprising:
   a processor;
   memory accessible to the processor;
   processor-executable instructions stored in the memory executable to instruct the system to:
      receive an earth model that comprises elastic properties;
      receive seismic data for a region of interest, wherein the seismic data were acquired in a seismic survey;
      determine at least one exclusion criterion that provides one or more rules for selecting shot points in the acquired seismic data;
      determine sparse seismic data using statistical sampling based at least in part on the at least one exclusion criterion and the acquired seismic data;
      determine simulated seismic data based at least in part on the earth model for the region of interest and shot points corresponding to the sparse seismic data;
      determine an objective function that represents a mismatch between the sparse seismic data and the simulated seismic data;
      determine a gradient of the objective function;
      determine a smoothed gradient of the objective function based at least in part on at least one of the at least one exclusion criterion;
      perform a search based at least in part on the smoothed gradient wherein the search comprises a search direction and a step size found by a line search method;
      update values of the elastic properties of the earth model based at least in part on the search to generate an updated earth model wherein the step size corresponds to an amount of change for elastic properties as model parameters in the updated earth model; and
      based at least in part on the updated earth model, determine a presence of hydrocarbons in the region of interest.

* * * * *